(12) United States Patent
Paczkowski et al.

(10) Patent No.: US 9,276,424 B2
(45) Date of Patent: Mar. 1, 2016

(54) ADAPTER FOR FOLDABLE BATTERY CHARGER

(71) Applicant: Bren-Tronics, Inc., Commack, NY (US)

(72) Inventors: Henry Paczkowski, Manhasset Hills, NY (US); Daniel Sha, Farmingdale, NY (US); Peter J. Burke, East Northport, NY (US); Sai Fung, Melville, NY (US)

(73) Assignee: Bren-Tronics, Inc., Commack, NY (US)

( * ) Notice: Subject to any disclaimer, the term of this patent is extended or adjusted under 35 U.S.C. 154(b) by 89 days.

(21) Appl. No.: 14/156,147

(22) Filed: Jan. 15, 2014

(65) Prior Publication Data

US 2014/0132205 A1 May 15, 2014

Related U.S. Application Data

(63) Continuation-in-part of application No. 13/927,447, filed on Jun. 26, 2013.

(60) Provisional application No. 61/664,868, filed on Jun. 27, 2012.

(51) Int. Cl.
*H02J 7/00* (2006.01)

(52) U.S. Cl.
CPC ............ *H02J 7/0045* (2013.01); *H02J 7/0042* (2013.01)

(58) Field of Classification Search
USPC ........................................... 320/107
See application file for complete search history.

(56) References Cited

U.S. PATENT DOCUMENTS

| | | | |
|---|---|---|---|
| 3,919,615 A | 11/1975 | Niecke | |
| 5,295,089 A | 3/1994 | Ambasz | |
| 5,601,942 A | 2/1997 | Fedele | |
| 2005/0052156 A1 | 3/2005 | Liebenow | |
| 2011/0227527 A1* | 9/2011 | Zhu et al. | 320/108 |

* cited by examiner

*Primary Examiner* — Suchin Parihar
(74) *Attorney, Agent, or Firm* — Keusey & Associates, P.C.

(57) ABSTRACT

An adapter for a portable battery charging apparatus having two or more battery charging interfaces on separate panels. Wires electrically couple the battery charging apparatuses to a charger unit. The wires are routed for flexibility to fold and unfold the panels. The adapter is configured to nest between two panels of the battery charging apparatus when the panels are stacked together in a compact folded state.

20 Claims, 7 Drawing Sheets

ADAPTER FOR FOLDABLE BATTERY CHARGER

CROSS REFERENCE TO RELATED APPLICATIONS

This application is a Continuation-In-Part Application of co-pending U.S. patent application Ser. No. 13/927,447 filed on Jun. 26, 2013 which application claims the benefit of U.S. Provisional Patent Application Ser. No. 61/664,868 filed Jun. 27, 2012.

BACKGROUND OF THE INVENTION

1. Technical Field

The invention relates to an adapter for a foldable battery charger.

2. Description of the Related Art

Battery chargers are relatively large, bulky pieces of equipment. They typically have a rigid housing which can be moved but is difficult to transport by foot because of the weight and volume they occupy. Persons working in the field and military personnel have a need to carry battery chargers with them.

Some foldable equipment having batteries or chargers has been proposed in the prior art U.S. Pat. No. 3,919,615 discloses a flexible belt with a charger and batteries for a video camera. The power belt has a dedicated charging unit which can only charge one type of battery. The battery packs do not include hinges between them to allow the packs to stack on top of each other.

U.S. Published Patent Application No. 2005/0052156 shows a charging mat having an embedded control switching circuit. The charging mat does not include wires that connect discrete battery charging interfaces to allow stacking The charging mat does not include charging jacks of different types which nest together in a mating fashion. In addition, there is no disclosure of an adapter to mount different batteries, where the adapter can nest between panels in a folded state.

U.S. Pat. No. 5,295,089 discloses a flexible sheet material having embedded cables to couple various electronic devices. The device uses flat cables 46, 56, and 64, which has been shown to prematurely fail when bent repeatedly.

U.S. Pat. No. 5,601,942 shows a battery pack with foldable panels, attached batteries and a charger. The battery pack does not include an on-board charging unit or adapter that can nest between panels in a folded compact state.

None of the references show an adapter to connect batteries outboard of the panels or mat, where the adapter is able to nest between two panels of a portable battery charger when the panels are stacked together in a compact folded state.

SUMMARY OF THE INVENTION

Accordingly, it is an object of an embodiment of the invention to provide an adapter and charger for different types of batteries that can be packed into a small size for portability.

It is another object is to provide an adapter can be stored in a mating configuration to save space.

It is a further object to dimension the body of the adapter to allow charging of batteries outboard of the panels or mat.

It is another object to provide e adapter with a cable or fixed terminals for coup mg to various types of batteries.

These and other related objects are achieved according to the invention by a portable battery charging apparatus having two or more battery charging interfaces. A first and a second battery charging interface define a first and second panel respectively. A charger unit defines a third panel. Electrical wires operatively couple the charger unit to the battery charging interfaces. The wires have hinge-like flexibility to allow the panels to be configurable between two states. The first state comprises a compact folded state in which all three panels are stacked on top of each other thereby conserving space during transport. The second state comprises an unfolded, operational state in which at least the first and second panels are arranged side-by-side thereby providing clearance to insert batteries into said first and second battery charging interfaces. An adapter is configured to couple to one of the battery charging interfaces in the compact folded state.

Adjacent panels have sides which meet each other along a hinge axis that extends in a longitudinal direction. The electrical wires have a central section that extends generally parallel to the hinge axis. The central section is twisted when the adjacent panels are pivoted between the two states. The electrical wires have a distal section and a proximal section, which extend generally perpendicularly from the central section in opposite directions from each other. In the unfolded state, the wires have an S- or Z-shape. In the folded state, they have a C-shape.

The charging unit includes an input for receiving power from an upstream device, an output for powering a downstream device, and means for selectively powering each of said battery charging interfaces. Each battery charging interface includes two or more individual charging stations. Each battery charging interface includes a distal and a proximal end. A first charging station is located at the distal end; and a second charging station, different from the first charging station, is located at the proximal end. The adapter couples to one of the charging stations to provide a differently configured charging station. The electrical wires have multiple conductors that are divided into a first electrical bus for the first charging stations and a second electrical bus for the second charging stations.

The charger unit includes means for identifying different battery types when connected to the first charging station, the second charging station, or the adapter and means for selectively and independently powering each connected battery. Two or more portable battery charging apparatuses can be daisy chained together to share a common power source. The charger unit includes battery status indicators and a control to shut off the indicators. Each battery charging interface includes a circuit to identify at least one of battery presence, battery state-of-charge, and recharge status; and wherein information is transmitted between the circuit and the charger unit.

The first battery charging interface has a raised charging station at the distal end and a depressed charging station at the proximal end. The second battery charging interface has a depressed charging station at the distal end and a raised charging station at the proximal end. The first battery charging interface and the second battery charging interface face each other in the compact, folded state. The adapter is sandwiched between the first and second battery charging interfaces. In the compact, folded state the two raised charging stations fit within the two depressed charging stations. The adapter has a low-profile housing disposed between one of the raised charging stations and one of the depressed charging stations. Each battery charging interface includes an insulating pad that resides between the raised charging station and the corresponding fitted depressed charging station in the compact, folded state to prevent short circuits between the charging stations. The adapter is located between the insulating panel and one of the charging stations.

To increase the protection and durability of the charger, the charger may include a foldable mat that has the charger unit and the battery charging interfaces mounted on it. The mat is made of a flexible material, a waterproof material, nylon material, canvas material, a synthetic material, or a thermoplastic material. A strap is connected to the mat to secure the panels together in the folded state. The apparatus may include one or more battery charging interfaces defining a fourth or more panels. The mat may include regions that correspond to the panels. Regions can be arranged in a row, in an L-shape, a T-shape, or other configuration. The key feature is that the panels can be folded to stack on top of each other. This stack conserves space and protects the components which are internal of the stack.

The charger unit includes a circuit to identify at least one of adapter presence, battery presence, battery type, battery, state-of-charge and recharge status. The charger unit includes a portable device charging jack, for example a USB jack. If an external power source is not available, the USB jack may be powered by a battery coupled to one of the battery charging interfaces or the adapter.

In an alternate embodiment, there is provided an adapter for modifying a battery charging station on a portable battery charger. The adapter has a low-profile housing including an input connection and an output connection of a different type. The input connection is adapted to electrically couple, and re-movably mechanically attach, to a battery charging station of first type located on a panel of a portable, foldable battery charger. The low-profile housing is adapted and configured to nest between two panels of a portable battery charger when the panels are stacked in a compact folded state.

The low-profile housing includes a centrally-located depression, or well, that is dimensioned and positioned to receive a raised charging station located on a facing panel of a portable battery charger. The housing includes an elongated body that spaces the output connection from the input connection. The body is dimensioned, and elongated sufficiently, to locate the output connection outboard of the panels of a portable battery charger. Alternatively, the body is dimensioned, and elongated sufficiently, to locate the output connection outboard of a mat which supports the panels of a portable battery charger.

The output connection is a fixed battery charging station for coupling to a battery having a different interface than the input connection. Alternatively, for large batteries, the output connection is a cable extending from the adapter having a battery charging jack or jacks on its end to connect to a battery having a different interface than the input connection.

BRIEF DESCRIPTION OF DRAWINGS

The advantages, nature, and various additional features of the invention will appear more fully upon consideration of the illustrative embodiments now to be described in detail in connection with accompanying drawings. In the drawings like reference numerals denote similar components throughout the views.

DETAILED DESCRIPTION OF PREFERRED EMBODIMENTS

These and other objects, features, and advantages of the present invention will become apparent from the following detailed description of illustrative embodiments thereof, which is to be read in connection with the accompanying drawings.

Figure 1A:
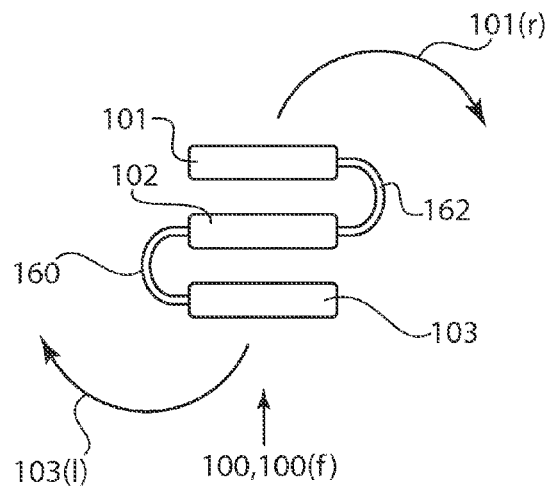
FIG. 1A is front side elevational schematic view of a battery charging apparatus according to an embodiment of the invention.
Figure 1B:
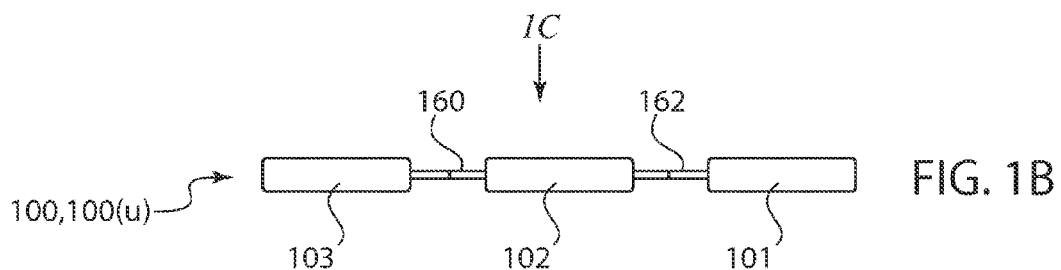
FIG. 1B is a further schematic view of the battery charging apparatus in an unfolded state.
Figure 1C:
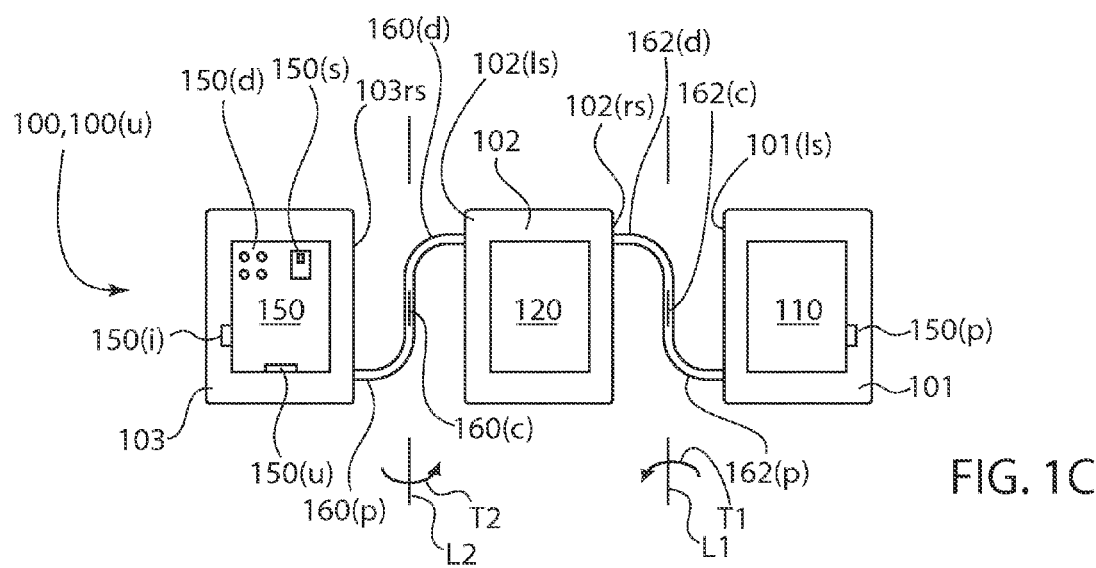
FIG. 1C is a top plan schematic view thereof.

Referring now in detail to the drawings, and in particular to FIGS. 1A, 1B and 1C, there is shown a battery charging apparatus 100 according to an embodiment of the invention. The battery charging apparatus includes two or more battery charging interfaces, a charger unit, and electrical connections therebetween. In a first embodiment, a first battery charging interface 110, a second battery charging interface 120, and a charger unit 150 are shown. Electrical wires 160 connect from the charger unit 150 to said second battery charging interface, and wires 162 connect from said second battery charging interface to first battery charging interface 110. Charging unit 150 is shown on the left of the battery charging interfaces. However, charging unit could be located between the battery charging interfaces, to the right of the interfaces, above or below the interfaces, or beneath the interfaces. The charging unit could be incorporated into an interface.

For the various configuration structures in one embodiment, the first battery charging interface is defined as a first panel 101, the second battery charging interface is defined as a second panel 102, and the charger unit 150 is defined as a third panel 103. FIG. 1A shows a folded state 100(*f*) wherein panels 101, 102, and 103 are stacked on top of each other to conserve space and protect the components during storage and transport. Panel 101 can be pivoted to the right, as indicated by arrow 101(*r*), to unfold the first battery charging interface. FIG. 1B shows a front view in the unfolded state 100(*u*) wherein panels 101 and 102 are arranged side-by-side to provide clearance to insert batteries into the battery charging interfaces. Panel 103 could be located between panels 101 and 102 or in any other location where it would avoid interference with battery insertion. From the location of FIG. 1A, panel 103 can be pivoted left, as indicated by arrow 103(*l*), to unfold the charger unit.

FIG. 1C shows a top plan view in the unfolded state 100(*u*). Each panel has a right side (rs) and a left side (ls). The right side 102(*rs*) of panel 102 meets the left side 101(*ls*) of panel 101 along a hinge axis that extends in a longitudinal direction L1. Electrical wires 162 have a central section 162(*c*) that extends generally parallel to the hinge axis. The electrical wires are routed in an S-shape between adjacent panels to provide a length of wire that can twist T1 about 180 degrees. In other words, central section 162(*s*) stays linear and allows the panels to pivot without inducing kinking or folding in the wire. When panel 101 is unfolded in direction 101(*r*), central section 162(*s*) twists in a direction opposite T1. The electrical wire includes a distal section 162(d) and a proximal section 162(p) that extend perpendicular to the central section 162(s) in opposite directions to make the connections to the interfaces.

Figure 1D:
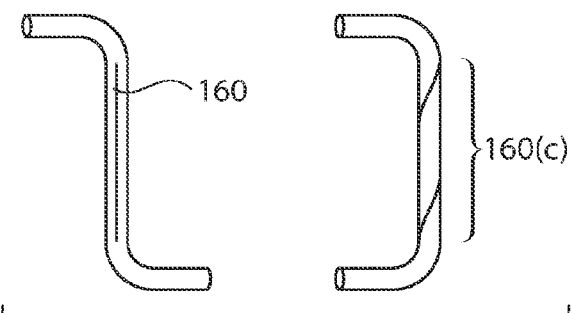
FIG. 1D is a schematic view of wire twisting movement between folded and unfolded states.

FIG. 1D shows the electrical wire 160 movement in greater detail. The left side of FIG. 1D shows electrical wire 160 in an S- or Z-shape when the battery charging apparatus 100 is in the unfolded state 100(u). A thin line extends down the central section of connecting wire 160 for illustrative purposes. When two panels 101, 102 are folded on top of each other, the central section 160(c) of the wire twists into a C-shape. The thin line is now shown in the right side of FIG. 1D as wrapping around the wire like a helical candy carte strip. When the panels are unfolded, the wire returns to the S-shape. The wire is selected for suitable gauge, number of conductors, stranded or solid, and length to withstand repeated twisting and untwisting. The electrical wires may also be referred to as a multi-conductor cable. As will be appreciated, the twisting of the wire along a longitudinal section thereof prevents the wire from kinking or folding at one point thereby extending its useful life.

The electrical wire 160 also includes a distal section 160 (d), a central section 160(c) generally parallel to the hinge axis extending in the longitudinal direction L2 for twisting in direction T2, and a proximal section 160(p). Electrical wire is shown between right side 103(rs) and left side 102(ls) of adjacent panels. Alternatively, the electrical wire 160 could connect panel 103 to the front, back, or bottom of the other panels. In a similar way, additional panels could be added to the apparatus to provide additional interfaces or other electronic devices. Charger unit 150 includes an input 150(i), which is adapted to receive power from an upstream external power supply. The power supply can be an AC mains, vehicle power, solar panel, bank of batteries, generator, or any other suitable fixed or portable power source. The charger unit also includes an output 150(p) that can provide power to a downstream device, for example, a further battery charging apparatus 100. While the input 150(i) is shown mounted on the charger unit 150, it can be placed in any location on the foldable battery charger with cables routing power to the charger unit 150. While the output 150(p) power jack is shown mounted on panel 103, it can be placed in any location on the foldable battery charger.

Standard power jacks may be incorporated into charger unit 150, for example, a USB jack 150(u) to provide power to recharge devices. Accordingly, a cell phone or tablet could he plugged into USB jack 150(u) to draw power while the larger batteries are being recharged in the battery charging interfaces. If external power is not available, one of the connected batteries may power the USB jack. Charger unit 150 may include one or several charge status displays 150(d), for example, lighted indicators, LED, or liquid crystal display. The lighted indicator(s) may be mufti-color or multi-state (flashing, solid). A switch 150(s) is provided to turn off all lighted indicators if a black-out condition is desired. In the embodiment of FIG. 1C, one colored LED can be provided for the status of each battery charging interface. For example, the LED will illuminate: Red if the battery connected to battery charging interface 110 is low on power; yellow to indicate the battery is charging; and green if the battery is completely charged. Alternatively, a set of red, yellow, and green LEDs may be provided for each battery charging interface.

The central section 162(c) of wire 162 is shown as the hinge structure. The hinge structure could also include a fabric strap, flexible material mat, or a conventional hinge, like a metal piano hinge or a plastic door hinge. The hinge parts could be extensions of the interfaces or panels. The hinge parts could be formed from a separate layer of material onto which the panels or interfaces are attached, as will be described in greater detail below.

Figure 2A:
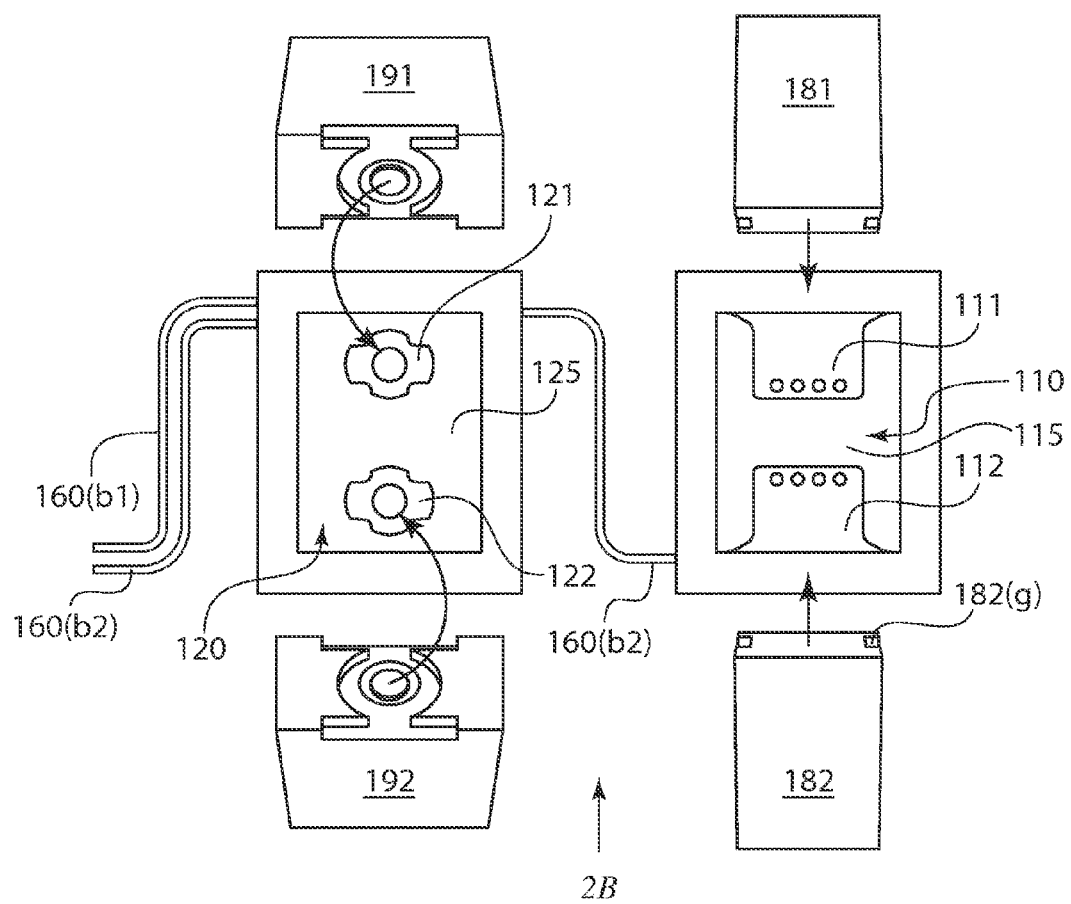
FIG. 2A is a top plan view showing details of the battery charging interfaces.

Each battery charging interface can be provided with 1, 2, or more individual charging jacks. In this application, a charging jack means a device or adapter configured and powered to recharge a single battery. FIG. 2A shows two charging jacks 111, 112 of a first type disposed on the first battery charging interface 110. The charging jacks include four round contacts, namely, two contacts for transmitting power and two additional contacts for receiving data about the battery's state, e.g., state of charge. The charging jack illustrated includes guide rails 112(r). The corresponding battery charging connector has two power and two data contacts. The housing of battery 182 includes grooves 182(g) that slide along the rail 112(r) to hold the battery charging connector in a fixed position to ensure a good connection.

Figure 2B:
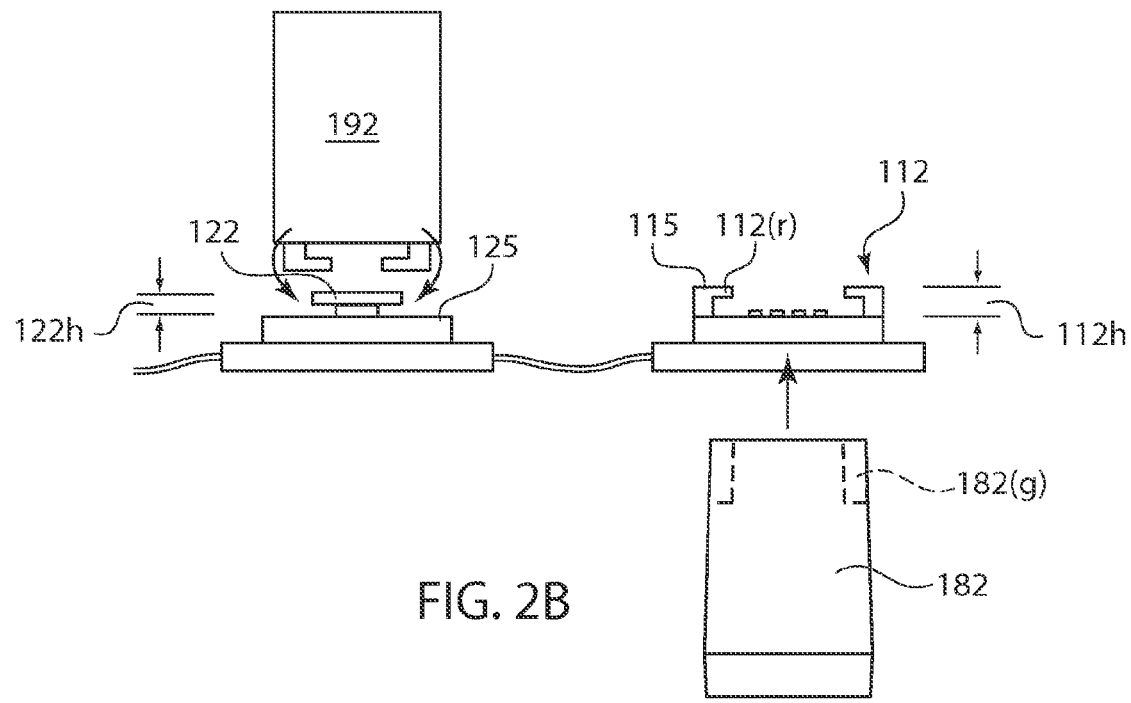
FIG. 2B is a front side elevational view thereof.

Battery charging interface 120 includes two charging jacks 121, 122 of the same type, each with concentric contacts for transmitting power and receiving data. The top plan view of FIG. 2A shows batteries 181 and 182 that can slide along the plane of the page into charging jacks 111, 112. It will be understood by those skilled in the art that the configuration of the charging jacks is similar to the configuration of the device that is powered by the battery. The front elevational view of FIG. 2B shows batteries 191 and 192 that can drop vertically and twist mount onto charging jacks 121, 122. Charging jacks 121, 122 are cross-shaped discs that are installed on a platform so that they sit slightly raised off the surface of the deck 125. FIG. 2B also shows charging jack 122 being a protruding jack extending a height 122(h) above the deck 125 of the battery charging interface 120. Charging jack 112 is a depressed jack retracting in height 112(h) below the deck 115 of the battery charging interface 110.

Figure 2C:
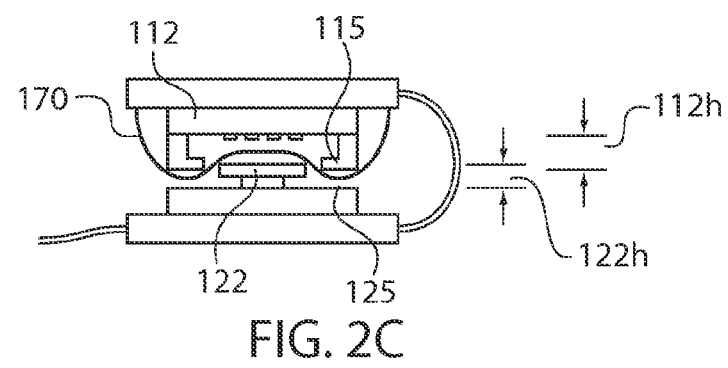
FIG. 2C is a further front view of the battery charging apparatus in the folded state.

FIG. 2C illustrates the folded state wherein the decks 115, 125 of battery charging interfaces 110, 120 are stacked together. The placement of the jacks 112 and 120 is arranged so that the protruding jack 122 can fit within the depression of the recessed jack 112 when the battery charging interfaces are folded. The height 112(h) of the depression of jack 112 is greater than the height 122(h) of the protruding jack 122. This allows the charging jacks to fully mate so that decks 115 and 125 will come into contact with each other thereby minimizing the volume of the folded battery charger. A non-conductive pad 170 may be provided as an insulating layer between jacks 112 and 122 to prevent short circuits between the jacks. In one embodiment, the insulating pad 170 comprises a fabric strap that is loosely connected across jacks 111, 112. The loose connection ensures that batteries 181, 182 have room to slide beneath the strap. A similar arrangement with the jack height, deck contact, and insulating layer is provided for jacks 111 and 121.

Figure 3A:
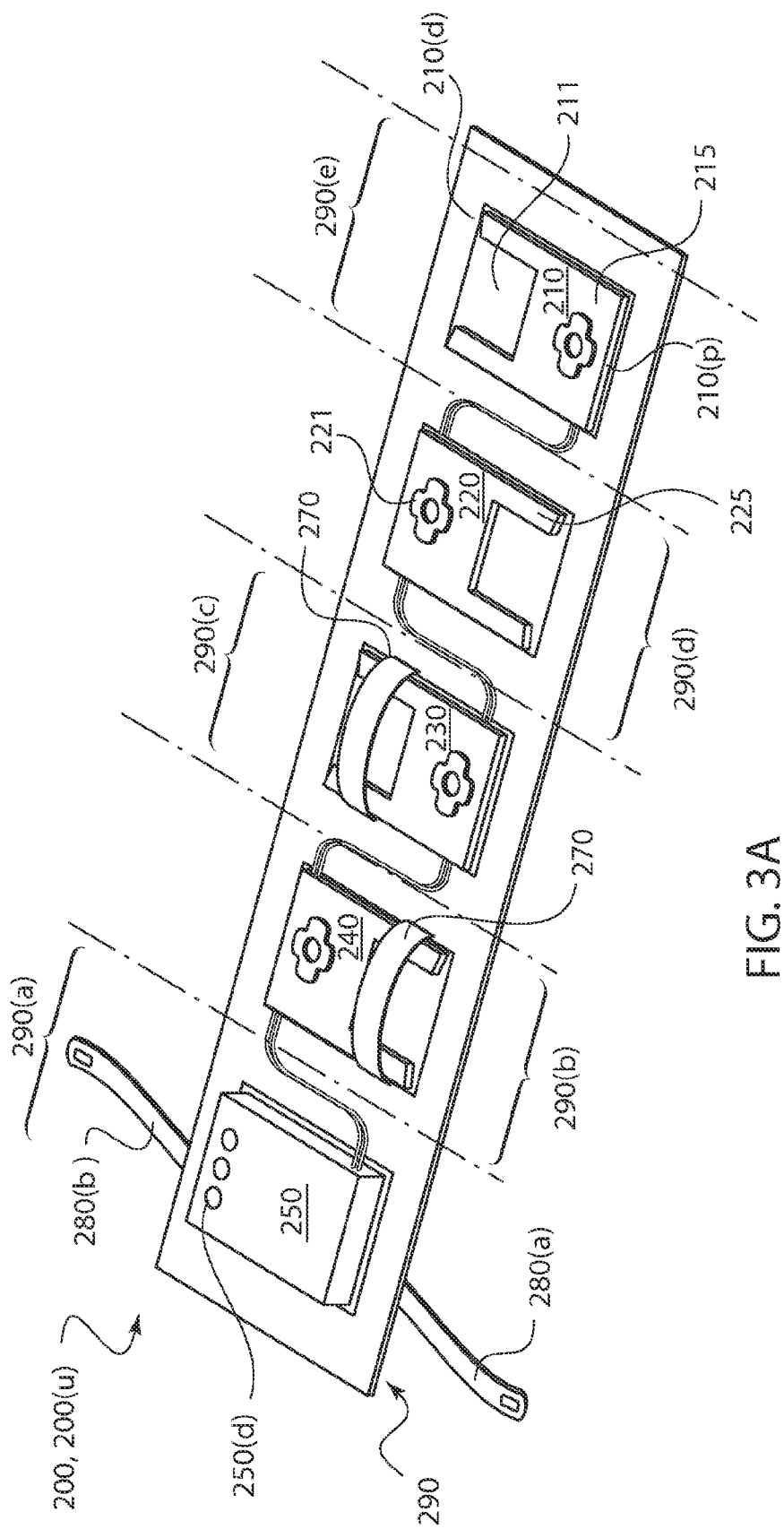
FIG. 3A is a perspective view of a battery charging device according to a further embodiment of the invention.
Figure 5:
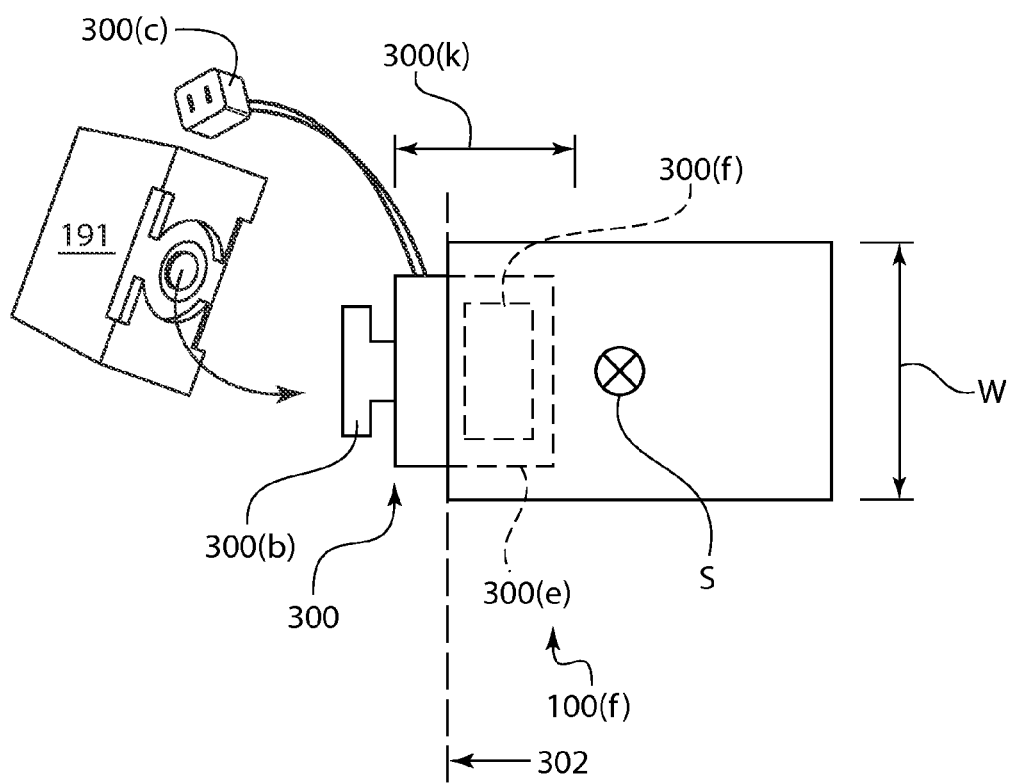
FIG. 5 is a top plan view of the battery charging device in the compact, folded state with the adapter installed.

FIG. 3A shows and alternate embodiment of a battery charging apparatus 200 having a foldable mat 290 divided into regions 290(a), 290(b), 290(c), 290(d), and 290(e). The regions may serve as the panels, The mat 290 can be made of a flexible, preferably waterproof material, for example, nylon or canvas. The charger unit 250 is secured to the first region. Each of the other regions has one battery charging interface 210, 220, 230 or 240 secured to it. Of course, a fewer or greater number of regions may be provided. The charger unit may be located in any of the regions. While the regions are shown arranged linearly, they may be alternately be disposed in a T-shape, L-shape, cross shape, or other suitable arrangement. Each region may contain one or more charging jacks, with the charging jacks being freely selected to recharge any type of battery. Due to the flexible nature of the mat 290, one region can be folded to overlie the adjacent region. Consider two or more panels or regions each having a width W. The mat 200 in FIG. 3A would have an overall width of SW in the unfolded state 200($u$). FIG. 5 shows the stack S wherein the regions or panels are overlying each other, i.e., the folded state 200($f$). The overall width of the stack is W, with the regions or panels forming a series of planes that are disposed parallel to each other. In the unfolded state 200($u$), the regions or panels are re-oriented to be co-planar. In the field, the mat 200 can be laid out to provide a clean, dry surface to insert batteries into the charging jacks.

The protruding charging jacks 221 are connected to a first bus, while the depressed charging jacks 211 are connected to a second bus. Accordingly, the charger unit views the eight charging jacks as two separate groups, each with its own type of charging jack. As batteries are installed, they communicate state-of-charge and other battery data to the charging unit. As additional batteries are installed on the same bus, charging unit assesses the relative state-of-charge between the batteries and implements an appropriate recharging strategy. For example, batteries with the lowest state-of-charge may be charged first. Other batteries on the same bus may not receive a charge until the lowest battery reaches a predetermined level of charge. The battery charging interface 210, 220, 230, 240 may include part of the charger unit circuitry to identify the presence of a battery, identify battery type, and identify state-of-charge. This information will be communicated along the data channels of the bus to the charger unit, which can then implement a charging strategy and illuminate the appropriate charge status displays 250($d$). In the embodiment of FIG. 3A, charger unit 250 may be provided with eight multi-color LED lights, one for each of the eight charging jacks.

Battery charging interface 210 is shown with a depressed charging jack 211 at the distal end 210($d$) of the battery charging interface 210 on region 290($e$). A protruding charging jack 221 is then located at the distal end of the battery charging interface 220 on region 290($d$). In other words, each battery charging interface can include charging jacks of different types.

Figure 3B:
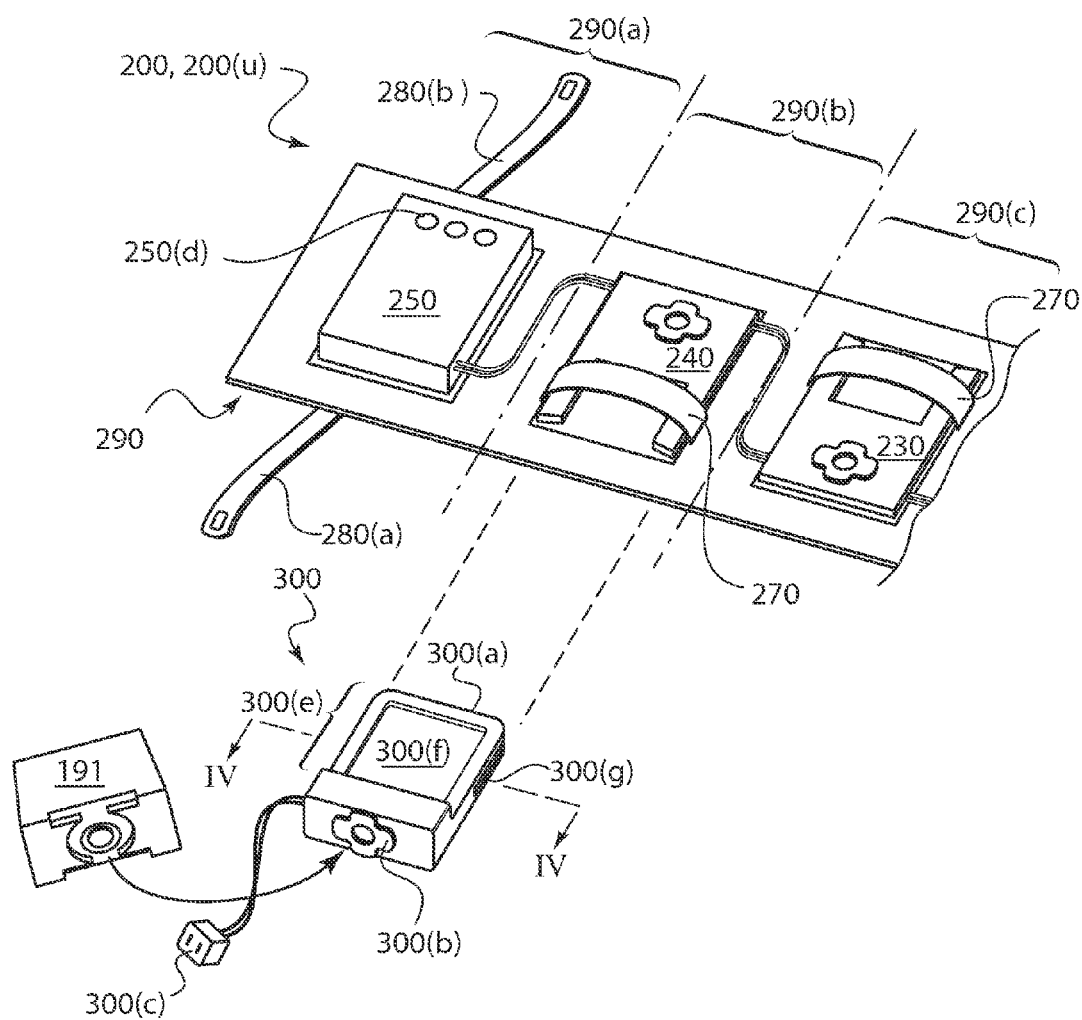
FIG. 3B is a perspective view of an adapter and a battery charging device.

FIG. 3B shows one embodiment of an adapter 300. In the illustrated example, the battery charging apparatus 200 needs an additional jack of the type identified by protruding charging jack 221. Adapter 300 includes an input connection 300$a$ that will electrically couple with the contacts on depressed charging jack 211. Adapter 300 has grooves 300$g$ that will mechanically engage charging jack 211, by sliding along the rails 112($r$) of the charging jack. Adapter 300 includes contacts and grooves to engage charging jack 211 in a manner similar to battery 182 and its grooves 182($g$). Adapter 300 includes a fixed output connection 300$b$, similar to charging jack 221, for connecting to a battery 192. The battery charging apparatus 200 with battery charging interfaces 230 and 240 provides two protruding charging jacks 221. With the addition of two adapters 300, the battery charging apparatus would be equipped with four protruding charging jacks, namely the two protruding charging jacks 221 and two fixed output connections 300$b$. Alternatively, or in addition, adapter 300 includes a flexible cable that terminates in an output connection 300($c$). The flexible cable can be used to charge a large battery by bringing the battery charging apparatus 200 near the large battery and coupling the output connection 300($c$) to the large battery contacts via the flexible cable.

Figure 4:
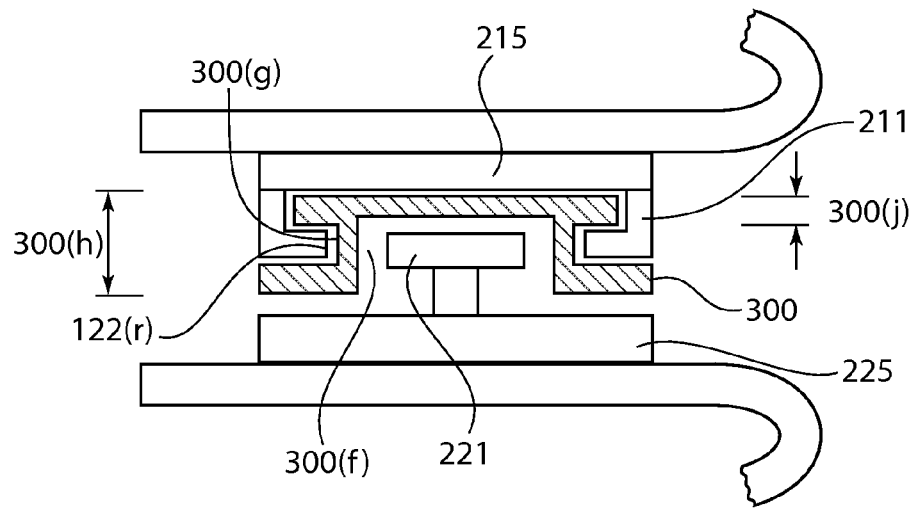
FIG. 4 is a cross-sectional view of the folded battery charging device, taken along the line IV-IV through the adapter.

Referring now to FIGS. 3B, 4 and 5, adapter 300 includes a low-profile housing 300($e$) characterized by a depression 300($f$) that resides within depressed charging jack 211 and accommodates protruding charging jack 221, when the battery charging apparatus is in the compact, folded state. FIG. 4 shows adapter 300 in cross-section with the battery charging apparatus folded. Rails 112($r$) are disposed within grooves 300($g$) to mechanically attach adapter 300 to the depressed charging jack 211. The overall height 300($h$) of adapter 300 and the depression height 300($j$) are dimensioned so that protruding charger 221 can nest within depressed charging jack 211 in the same manner as if adapter 300 was not present. In other words, the presence of the adapter does not interfere with the battery charging apparatus transitioning between the open and folded states.

FIG. 5 shows the length 300($k$) of housing 300($e$) which is dimensioned to locate the output connection 300($b$) outboard of the battery charging interfaces and mat. The vertical dotted line represents the lower edge of the battery charging interfaces, or mat, with arrow 302 indicating the portion of adapter 300 that extends outboard thereof. Charging unit 250 can recognize the type and status of a battery, or batteries, coupled to the adapter. Each battery charging interface includes a circuit to identify at least one of adapter presence, battery presence, battery type, battery state-of-charge, and recharge status, which information is transmitted between the circuit and the charger unit.

Figure 6:
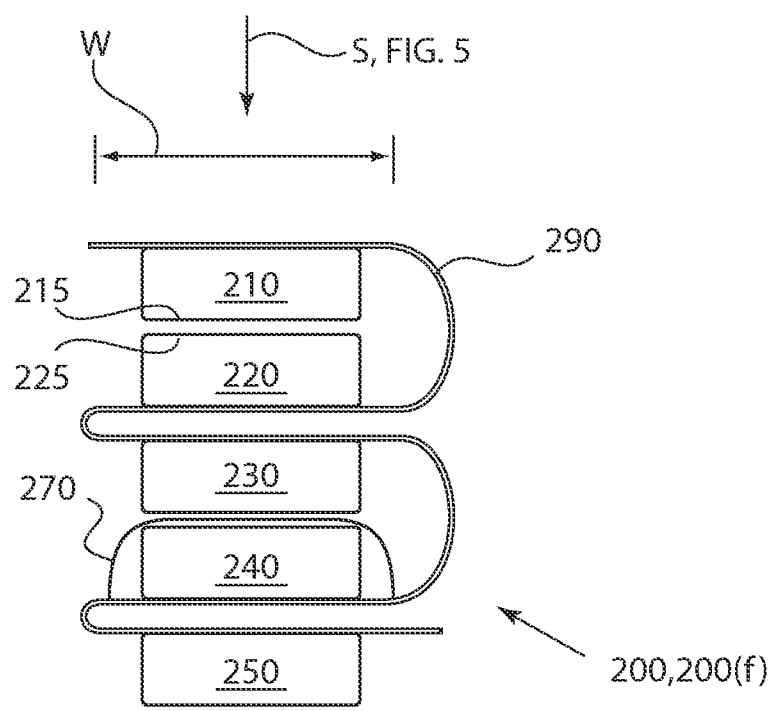
FIG. 6 a front side elevational schematic view of the battery charging device in the compact, folded state.

FIG. 6 shows the mat 290 folded four times to bring all five regions into a stack. This is equivalent to stacking the panels on top of each other. In this folded state, the protruding jacks on battery charging interface 210 fit within the depressed jacks of battery charging interface 220. By staggering the placement of protruding and depressed jacks, each protruding jack will have a corresponding depressed jack to fit into when the mat is folded. FIG. 6 shows how deck 215 will lie flat against deck 225. The compactness of the stack can be maintained even with adapter 300 plugged in due to the structural configuration and dimensions of its low-profile housing. Straps 280($a$) having a hook fastener and strap 280($b$) having a loop fastener can wrap around the folded stack to keep it in the folded configuration until it is desired to deploy the battery charging apparatus.

Two or more panels each bearing a battery charging interface may be provided in a row, T-shape, L-shape, or other configuration. For example, a rectangular panel having a top side, a bottom side, and two sides may be provided with a hinge on one, two, three, or four of its sides. Several different charging jacks with imbedded circuitry can be replaced on, or added, to the battery charging interfaces.

Having described the preferred embodiments (which are intended to be illustrative and not limiting) for materials, configurations, and folding options, it is noted that modifications and variations can be made by persons skilled in the art in light of the above teachings. The hinge may be formed from the connecting wires, a mechanical hinge, or a flexible mat. The mat may be made from a variety of natural or synthetic materials which are sufficiently water resistant and durable for the intended applications. The panels can contain one or more charging jacks of the same or different type. An adapter couples to the charging jacks and provides an additional fixed or flexible charging jack, or both, of a different type. Charging jacks may be placed in offset configurations to facilitate compactness when the apparatus is in its compact, folded state. The adapter is sized and dimensioned to nest between the protruding charging jack and the depressed charging jack. It is, therefore, to be understood that changes may be made in the particular embodiments of the invention disclosed which are within the scope and spirit of the invention.

What is claimed is:

1. A portable battery charging apparatus comprising:
a first and a second battery charging interface which define a first and second panel respectively, wherein said first battery charging interface includes a raised charging station and said second battery charging interface includes a depressed charging station;
electrical wires operatively coupling said first and second battery charging interfaces and having hinge-like flexibility to allow the panels to be configurable between two states comprising (i) a compact folded state in which the first and second panels are stacked on top of each other with said raised charging station fitting within said depressed charging station thereby conserving space during transport, and (ii) an unfolded operational state in which said first and second panels are arranged side-by-side thereby providing clearance to insert batteries into said first and second battery charging interfaces; and
an adapter configured to couple to one of said charging stations to provide a differently configured charging station and dimensioned with a low-profile housing to fit between said raised charging station and said depressed charging station in the compact folded state.

2. The apparatus of claim 1, wherein adjacent panels have sides which meet each other along a hinge axis that extends in a longitudinal direction, and wherein said electrical wires have a central section that extends generally parallel to the hinge axis, wherein said central section is twisted when the adjacent panels are pivoted between the two states.

3. The apparatus of claim 2, wherein said electrical wires have a distal section and a proximal section which extend generally perpendicularly from the central section in opposite directions from each other.

4. The apparatus of claim 3, wherein each battery charging interface includes:
a distal and a proximal end;
a first charging station at the distal end and a second charging station at the proximal end.

5. The apparatus of claim 4, further comprising a charger unit defining a third panel and including means for identifying different battery types when connected to one of said first charging station, said second charging station, and said adapter and means for selectively and independently powering each connected battery.

6. The apparatus of claim 4, wherein
said first battery charging interface has said raised charging station at the distal end and a depressed charging station at the proximal end; and
said second battery charging interface has said depressed charging station at the distal end and a raised charging station at the proximal end.

7. The apparatus of claim 6, wherein said first battery charging interface and said second battery charging interface face each other in the compact folded state, wherein said adapter is sandwiched between said first and second battery charging interfaces.

8. The apparatus of claim 7, wherein in the compact folded state the two raised charging stations fit within the two depressed charging stations.

9. The apparatus of claim 8, wherein each battery charging interface includes an insulating pad that resides between the raised charging station and the corresponding fitted depressed charging station in the compact, folded state to prevent short circuits between the charging stations, and wherein said adapter is disposed between said insulating pad and one of said charging stations.

10. The apparatus of claim 1, further including a foldable mat, wherein said battery charging interfaces are mounted to the mat, wherein said mat is made of a flexible material selected from the group consisting of a waterproof material, nylon material, canvas material, a synthetic material, and a thermoplastic material.

11. The apparatus of claim 1, further comprising one or more battery charging interfaces defining a fourth or more panels.

12. The apparatus of claim 5, wherein said charger unit includes battery status indicators and a control to shut off the indicators, and wherein each battery charging interface includes a circuit to identify at least one of adapter presence, battery presence, battery type, battery state-of-charge, and recharge status, and wherein information is transmitted between the circuit and the charger unit.

13. The apparatus of claim 5, wherein said charger unit includes one of a USB jack and a portable device charging jack, wherein said charger unit further includes a portable device charging circuit for powering one of the USB jack and portable device jack from a battery coupled to one of the battery charging interfaces and the adapter.

14. An adapter for modifying a battery charging station on a portable battery charger comprising:
an adapter having a low-profile housing including:
an input connection for electrically coupling to a battery charging station of a first type located on a panel of a portable battery charger; and
an output connection of a second type; and
said low-profile housing being dimensioned to nest between a raised charging jack on one panel and a depressed charging jack on a facing panel of a portable battery charger when the panels are stacked together in a compact folded state.

15. The adapter of claim 14, wherein said low-profile housing includes a centrally-located, depression that is dimensioned and positioned to overlie the depressed charging jack and to receive the raised charging jack.

16. The adapter of claim 15, wherein said low-profile housing includes an elongated body that spaces said output connection from said input connection, wherein said elongated body is dimensioned to locate said output connection outboard of the panels of a portable battery charger.

17. The adapter of claim 15, wherein said low-profile housing includes an elongated body that spaces said output connection from said input connection, wherein said elongated body is dimensioned to locate said output connection outboard of a mat which supports the panels of a portable battery charger.

18. The adapter of claim 17, wherein said output connection comprises a fixed battery charging station that is adapted and configured to couple to a battery having an interface different than said input connection.

19. The adapter of claim 17, wherein said output connection comprises a cable terminating in a battery charging jack that is adapted and configured to couple to a battery having an interface different than said input connection.

20. The adapter of claim 14, wherein said adapter is configured to cooperate with a circuit to identify at least one of adapter presence, battery presence, battery type, battery state-of-charge, and recharge status.

\* \* \* \* \*